United States Patent
Jonsson et al.

(10) Patent No.: US 11,790,717 B2
(45) Date of Patent: Oct. 17, 2023

(54) EMERGENCY DELEGATION

(71) Applicant: ASSA ABLOY AB, Stockholm (SE)

(72) Inventors: Tomas Jonsson, Rönninge (SE); Fredrik Einberg, Huddinge (SE); Sona Singh, Täby (SE); Johan Von Matern, Täby (SE); Frans Lundberg, Saltsjöbaden (SE)

(73) Assignee: ASSA ABLOY AB, Stockholm (SE)

( * ) Notice: Subject to any disclaimer, the term of this patent is extended or adjusted under 35 U.S.C. 154(b) by 137 days.

(21) Appl. No.: 17/298,259

(22) PCT Filed: Dec. 17, 2019

(86) PCT No.: PCT/EP2019/085577
§ 371 (c)(1),
(2) Date: May 28, 2021

(87) PCT Pub. No.: WO2020/127212
PCT Pub. Date: Jun. 25, 2020

(65) Prior Publication Data
US 2022/0122400 A1    Apr. 21, 2022

(30) Foreign Application Priority Data
Dec. 18, 2018   (EP) .................................. 18213557

(51) Int. Cl.
*G07C 9/38*   (2020.01)
*H04W 4/90*   (2018.01)
(Continued)

(52) U.S. Cl.
CPC ........... *G07C 9/38* (2020.01); *G07C 9/00571* (2013.01); *H04L 9/0825* (2013.01); *H04W 4/90* (2018.02);
(Continued)

(58) Field of Classification Search
None
See application file for complete search history.

(56) References Cited

U.S. PATENT DOCUMENTS 10,522,029 B1 * 12/2019 Alexander ............. G08B 25/14
10,726,654 B2 *  7/2020 Siklosi ....................  G07C 9/28
(Continued)

FOREIGN PATENT DOCUMENTS

CN   103426215   12/2013
CN   107004312    8/2017
(Continued)

OTHER PUBLICATIONS

Official Action with English Translation for China Patent Application No. 201980083442.8, dated Jun. 30, 2022, 20 pages.
(Continued)

*Primary Examiner* — K. Wong
(74) *Attorney, Agent, or Firm* — Schwegman Lundberg & Woessner, P.A.

(57) ABSTRACT

It is provided a method for controlling access to a physical space using an emergency delegation. The method is performed in a lock device and comprises the steps of: receiving an access request from an electronic key; obtaining a plurality of delegations, wherein each delegation is a delegation from a delegator to a delegatee, the plurality of delegations collectively forming a chain of delegations wherein when two delegations are chained together, the delegatee of one delegation is the delegator of the next delegation; determining that a delegation in the chain of delegations is an emergency delegation, the emergency delegation indicating that access should only be granted when an emergency situation occurs; determining when an emergency situation occurs; and granting access to the physical space when the
(Continued)

chain of delegations starts in the lock device and ends in the electronic key; and when the emergency situation occurs.

18 Claims, 2 Drawing Sheets

(51) Int. Cl.
*G07C 9/00* (2020.01)
*H04L 9/08* (2006.01)

(52) U.S. Cl.
CPC .............. *G07C 2009/00769* (2013.01); *G07C 2209/04* (2013.01)

(56) References Cited

U.S. PATENT DOCUMENTS

| | | | |
|---|---|---|---|
| 11,129,010 B2 * | 9/2021 | Wickham | H04W 4/029 |
| 11,263,840 B2 * | 3/2022 | Olsson | G07C 9/00174 |
| 2006/0072755 A1 | 4/2006 | Oskari | |
| 2016/0180696 A1 * | 6/2016 | Janardhanan | G08B 25/008 |
| | | | 340/501 |
| 2018/0182191 A1 | 6/2018 | Wagstaff | |
| 2022/0028198 A1 * | 1/2022 | Lundberg | G07C 9/215 |

FOREIGN PATENT DOCUMENTS

| | | |
|---|---|---|
| CN | 107735817 | 2/2018 |
| EP | 3291183 | 3/2018 |
| EP | 3671662 | 6/2020 |
| GB | 2517527 | 2/2015 |
| WO | WO 2016/087478 | 6/2016 |
| WO | 2020127212 | 6/2020 |

OTHER PUBLICATIONS

Taly et al. "Distributed Authorization in Vanadium," arxiv.org, Jul. 7, 2016, 24 pages.

Extended Search Report for European Patent Application No. 18213557.4, dated Jun. 14, 2019, 10 pages.

International Search Report and Written Opinion for International (PCT) Patent Application No. PCT/EP2019/085577, dated Feb. 28, 2020, 15 pages.

Official Action with English Translation for China Patent Application No. 201980083442.8, dated Nov. 22, 2022, 11 pages.

"European Application Serial No. 18213557.4, Noting of loss of rights pursuant to Rule 112(1) EPC mailed Feb. 5, 2021", 2 pgs.

"International Application Serial No. PCT EP2019 085577, International Preliminary Report on Patentability dated Jul. 1, 2021", 10 pgs.

\* cited by examiner

EMERGENCY DELEGATION

CROSS REFERENCE TO RELATED APPLICATIONS

This application is a national stage application under 35 U.S.C. 371 and claims the benefit of PCT Application No. PCT/EP2019/085577 having an international filing date of Dec. 17, 2019, which designated the United States, which PCT application claimed the benefit of European Patent Application No. 18213557.4 filed Dec. 18, 2018, the disclosure of each of which are incorporated herein by reference.

TECHNICAL FIELD

The present disclosure relates to the field of controlling access to physical space using delegated access, where at least one delegation in a delegation chain needs to be co-signed by an access controller.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

In general, the lock owner give access to the lock those that are trusted with such privileges, such as family members, cleaning personnel, etc. In emergency situations, access might need to be granted to an additional set of people. For instance, in the situation of a break-in, when a burglar alarm is set off, access should be granted for neighbours or the police, saving the police from having to break open the door. If there is a fire, access should be granted for the fire brigade, saving the fire brigade from having to break open the door.

However, granting access to neighbours and emergency services can also pose a security risk, since any one of these people can walk right up to the premises and enter.

SUMMARY

It an object of the present disclosure to enable a lock owner to grant access to certain people for an offline lock in an emergency situation without giving blanket access.

According to a first aspect, it is provided a method for controlling access to a physical space using an emergency delegation. The method is performed in a lock device and comprises the steps of: receiving an access request from an electronic key; obtaining a plurality of delegations, wherein each delegation is a delegation from a delegator to a delegatee, the plurality of delegations collectively forming a chain of delegations wherein when two delegations are chained together, the delegatee of one delegation is the delegator of the next delegation; determining that a delegation in the chain of delegations is an emergency delegation, the emergency delegation indicating that access should only be granted when an emergency situation occurs, wherein one or more types of emergency situation are specified in the emergency delegation; determining when an emergency situation occurs; and granting access to the physical space when the chain of delegations starts in the lock device and ends in the electronic key; and when the emergency situation of the occurs.

The one or more types of emergency situation may be any one of break-in, fire, water leak, health emergency.

The step of determining when an emergency situation occurs may comprise communicating with an emergency service provider forming part of the chain of delegations.

The step of determining when an emergency situation occurs may comprise communicating with a sensor device in the physical space.

The sensor device may be any one of a wearable device, a fire detector, or water leak detector.

The step of determining when an emergency situation occurs may comprise communicating with a monitoring device collecting data from one or more sensor devices in the physical space.

The step of determining when an emergency situation occurs may comprises finding a mapping between the one or more emergency situations specified in the emergency delegation and one or more monitoring devices.

The step of determining when an emergency situation occurs may comprise communicating with a smart home system.

According to a second aspect, it is provided a lock device for controlling access to a physical space using an emergency delegation. The lock device comprises: a processor; and a memory storing instructions that, when executed by the processor, cause the lock device to: receive an access request from an electronic key; obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation; determine that a delegation in the chain of delegations is an emergency delegation, the emergency delegation indicating that access should only be granted when an emergency situation occurs, wherein one or more types of emergency situation are specified in the emergency delegation; determine when an emergency situation occurs; and grant access to the physical space when the chain of delegations starts in the lock device and ends in the electronic key; and when the emergency situation occurs.

The type of emergency situation may be any one of break-in, fire, water leak, health emergency.

The instructions to determine when an emergency situation occurs may comprise instructions that, when executed by the processor, cause the lock device to communicate with an emergency service provider forming part of the chain of delegations.

The instructions to determine when an emergency situation occurs may comprise instructions that, when executed by the processor, cause the lock device to communicate with a sensor device in the physical space.

The sensor device may be any one of a wearable device, a fire detector, or water leak detector.

The instructions to determine when an emergency situation occurs may comprise instructions that, when executed by the processor, cause the lock device to communicate with a monitoring device collecting data from one or more sensor devices in the physical space.

The instructions to determine when an emergency situation occurs may comprise instructions that, when executed by the processor, cause the lock device to find a mapping between the one or more emergency situations specified in the emergency delegation and one or more monitoring devices.

The step of determining when an emergency situation occurs may comprise communicating with a smart home system.

According to a third aspect, it is provided a computer program for controlling access to a physical space using an emergency delegation. The computer program comprises computer program code which, when run on a lock device causes the lock device to: receive an access request from an electronic key; obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation; determine that a delegation in the chain of delegations is an emergency delegation, the emergency delegation indicating that access should only be granted when an emergency situation occurs; determine when an emergency situation occurs; and grant access to the physical space when the chain of delegations starts in the lock device and ends in the electronic key; and when the emergency situation occurs.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are based on delegation chains from the lock device. The delegation chain allows the lock device to be offline. Additionally, the delegation chain here comprises an emergency delegation, whereby the delegation can only be used at the lock device when an emergency situation occurs. This allows the lock owner to grant access to a great number of people and/or organisations who may be of great help in an emergency situation, but for which the lock owner does not want to give general access. This improves the ability of the lock owner to give emergency access with minimal security risk.

Figure 1:
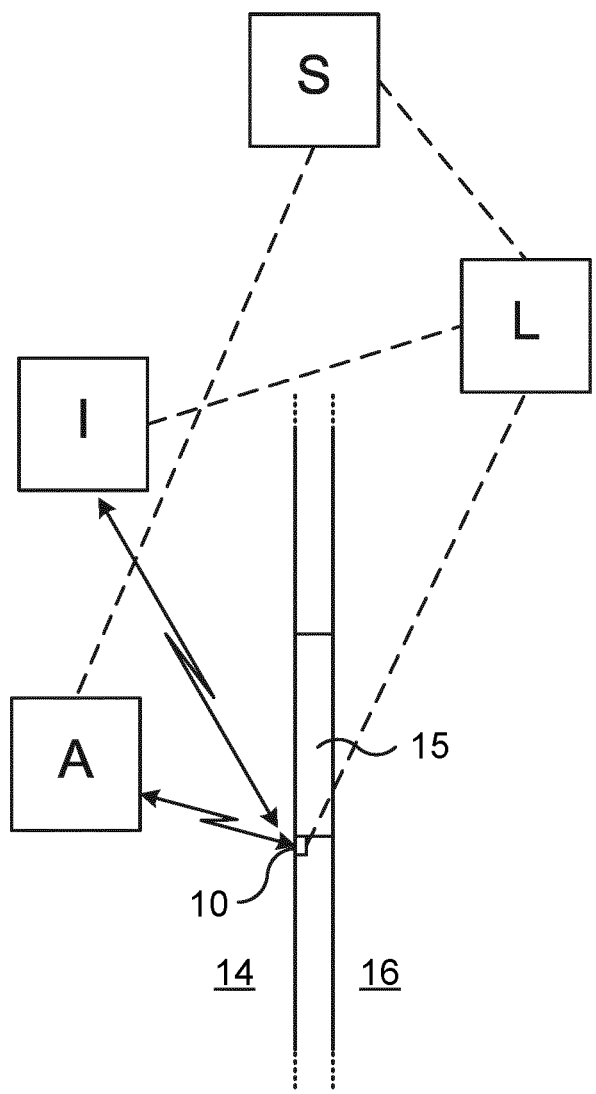
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable using a lock device 10. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible. The restricted physical space 14 can be part of a home, a commercial property, etc.

The owner L or user of the lock device 10 is here denoted a lock owner L. The lock owner L may carry a lock owner device, which is any suitable electronic device, e.g. a smartphone, mobile phone, tablet computer, laptop computer, desktop computer, smart television, set top box, etc.

The lock device 10 can communicate with electronic keys. Such electronic keys may be implemented as part of a mobile phone, a smartphone, a key fob, wearable device, smart phone case, access card, electronic physical key, etc. The electronic key can communicate with the lock device 10 over a wired or wireless interface, e.g. using Bluetooth, Bluetooth Low Energy (BLE), any of the IEEE 802.15 standards, Radio Frequency Identification (RFID), Near Field Communication (NFC).

There may also an emergency service provider S. The emergency service provider S can e.g. be a security company, the police, the fire brigade or an ambulance service. The emergency service provider S uses a service provider agent A to deliver the (emergency) service when needed. The service provider agent A is a physical person and can be an employee or a sub-contractor of the emergency service provider S.

Additionally, there can be private individuals I, such as neighbours or friends of the lock owner L.

As explained in more detail below, the lock owner L wants to give access to the restricted space 16 to suitable persons or organisations, but only under the condition that an emergency situation occurs.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication.

Now the concept of delegation of access rights will be explained and how this is employed in embodiments presented herein. Each delegation is a delegation from a delegator to a delegatee. A plurality of delegations collectively form a chain of delegations. For each link in the chain, when two delegations are chained together, the delegatee of one delegation is the delegator of the next delegation. Each entity in the delegation chain, i.e. all delegators and delegatees use physical devices such as portable devices or computers/servers in the operations using delegations. In other words, whenever it is mentioned that a party is a delegator or delegatee in this document, this is implemented in such a physical device.

The plurality of delegations may form a chain. For instance, consider the following example of a chain of delegation:

L→S→A

Using the reference signs used above, L denotes the lock owner, S denotes the emergency service provider and A denotes the service provider agent. Hence, this chain of delegations starts in the lock owner, and proceeds from the lock owner, to the emergency service provider, and to the service provider agent. When this delegation is valid, the service provider agent A is delegated access, indirectly, by the lock owner L.

Each arrow is a delegation and each delegation is a data item which can be communicated over a digital communication channel and can be stored in memory. Each delegation contains (references to) a delegator and a delegatee. All delegations can use the same data format, making extensions to the delegation chain or structure of delegations simple, thereby improving flexibility in the delegation chain. Moreover, by employing the same data format for all the delegations, it is easier and more consistent for the lock device, which eventually checks the validity of the delegation chain, to check the delegations in the delegation chain.

The delegation can be cryptographically signed by the delegator, using any suitable signing algorithm and a private key of the delegator. The signature can be verified using a public key (corresponding to the private key) of the delegator. The cryptographical signature can be appended to the delegation.

In the following, a signed delegation is indicated by a double line delegation. For instance, the following denotes a delegation from the emergency service provider S to the service provider agent A, where the delegation is cryptographically signed by emergency service provider S.

S⇒A

When the service provider agent arrives and needs the lock device to unlock, the service provider agent (or more specifically, a device of the service provider agent) transmits at least the last delegation in the chain of delegations to the lock device. In one embodiment, only the first delegation (from the lock device) is stored in the lock device. All later delegations in the chain of delegations are transmitted from the service provider agent.

According to embodiments herein, a delegation can also contain an emergency condition, stipulating that access should only be granted when an emergency situation occurs. Such a delegation is here denoted (e:ET), where 'ET' denotes one or more emergency types that are valid for grant to be granted.

The following example denotes a delegation from the lock owner to an individual, e.g. neighbour, where the delegation is an emergency delegation that access should only be granted when there is break-in (BI) or fire (F), L-(e:BI, F)→C A slightly more detailed example is a delegation to an emergency service provider, the police (Sp) in this case, with the condition that access is only granted when there is a break-in:

L-(e:BI)→Sp==(e:BI)⇒A

In the delegation chain, when there is an emergency delegation, any further delegations after the emergency delegation are also emergency delegations.

When the service provider agent A arrives at the lock device, the service provider agent A sends an access request to the lock device 10. The service provider agent A also provides, from the chain of delegations, the delegation by the emergency service provider Sp (the police in this case).

The lock device 10 also obtains the first delegation, from the lock owner L to the coordinator, e.g. from local memory or from the service provider agent A.

The use of the chain of delegations allow the lock device 10 to verify the authority of any service provider agent A or individual I, to thereby determine whether the lock device 10 should change state to allow access to a privileged function that is defined in the emergency delegation, e.g. by setting itself in an unlocked state to allow access to the restricted space 16. The privileged function could also be e.g. to find out whether there are persons in the property. This verification is based on the delegations of the delegation chain, i.e. data provided by the service provider agent A and optionally locally stored data. Hence, the lock device 10 does not need to have network access to perform this verification. Furthermore, the lock determines when an emergency situation occurs by communicating with an external entity X. The external entity can e.g. be a smart home system which can contain e.g. an alarm system, a fire detector, water leak sensors, health detection system, etc.

Figure 2:
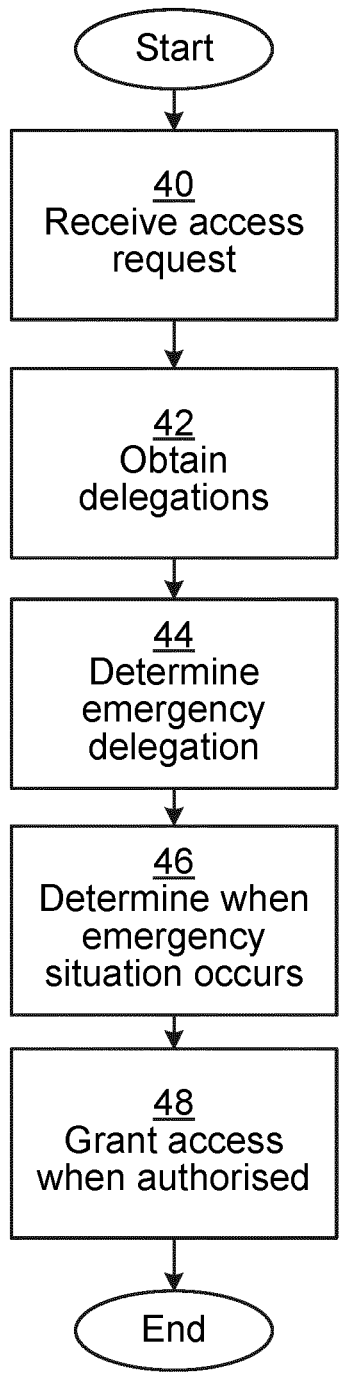
FIG. 2 is a flow chart illustrating method for controlling access to a physical space.

FIG. 2 is a flow chart illustrating method for controlling access to a physical space. The method being performed in a lock device.

In a receive access request step 40, the lock device receives an access request from an electronic key. The electronic key can e.g. belong to the service provider agent A or the individual I of FIG. 1.

In an obtain delegations step 42, the lock device obtains a plurality of delegations. As explained above, each delegation is a delegation from a delegator to a delegatee. The plurality of delegations collectively form a chain of delegations. For each link in the chain, when two delegations are chained together, the delegatee of one delegation is the delegator of the next delegation.

At least part of the delegations in chain of delegations can be received from the electronic key. In one embodiment, all delegations (in the chain of delegations), except the first delegation (by the lock owner) are received from the electronic key.

In a determine emergency delegation step 44, the lock device determines that a delegation in the chain of delegations is an emergency delegation. As mentioned above, the emergency delegation indicates that access should only be granted when an emergency situation occurs, at the site of the physical space. The emergency delegation can specify an emergency situation which is a necessary condition for granting access with this delegation. Moreover, the emergency delegation optionally specifies an address with which to communicate to determine whether the emergency situation occurs.

In a determine when emergency situation occurs step 46, the lock device determines when an emergency situation (currently) occurs. The type of emergency situation can e.g. be any one of break-in, fire, water leak, health emergency. Health emergency can e.g. be if a person has fallen down or is critically ill. In such a situation, ambulance personnel or care workers may need access. The detection of health emergency can e.g. be based on accelerometer data of a wearable device indicating that a person has fallen down or has not moved for a period of time longer than a threshold time. Alternatively or additionally, the health emergency can be determined if a person presses a health alarm button, e.g.

on a bracelet or other wearable device. Alternatively or additionally, the health emergency can be based on health sensors, e.g. pulse meters, etc. The emergency situation can be determined by the lock device (1) communicating with a sensor device (e.g. fire detector, wearable device, water leak detector, etc.) in the physical space. Alternatively ore additionally, the emergency situation can be determined by communicating with a monitoring device (e.g. fire detector, wearable device, water leak detector, etc.) hub within the physical space or remote server) collecting data one or more sensor devices (in the physical space. Such a device can e.g. be a smart home system hub.

Optionally, the lock device finds a mapping between the one or more emergency situations specified in the emergency delegation and one or more monitoring devices, to derive which monitoring device(s) to communicate with to determine if an emergency situation currently occurs.

Optionally, the emergency situation is determined to currently occur a predefined time after a detected event. For instance, the emergency situation of a break-in may be considered to occur for two hours after a burglary alarm is triggered. After a fire alarm is triggered, the emergency situation may be considered to occur for six hours, etc. Alternatively or additionally, the emergency situation is inactivated (in the system) by a person who has been given the emergency delegation. For instance, a care worker has entered a home to help a person who has fallen down. After the person has been helped and is in a stable, safe situation, the care worker can deactivate the emergency situation, securing the lock again to a normal state and may leave.

In a grant access when authorised step 48, the lock device grants access to the physical space, or to a privileged lock function, when the chain of delegations starts in the lock device and ends in the electronic key and when the emergency situation (e.g. specified in the emergency delegation) occurs.

Figure 3:
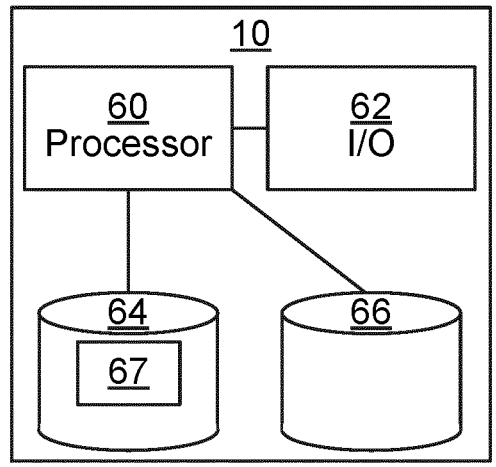
FIG. 3 is a schematic diagram illustrating components of the lock device of FIG. 1.

FIG. 3 is a schematic diagram illustrating components of the lock device 10 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random-access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The lock device further comprises an I/O interface 62 for communicating with external entities, such as a key device. Optionally, the I/O interface 62 also includes a user interface.

Other components of the lock device 10 are omitted in order not to obscure the concepts presented herein.

Figure 4:
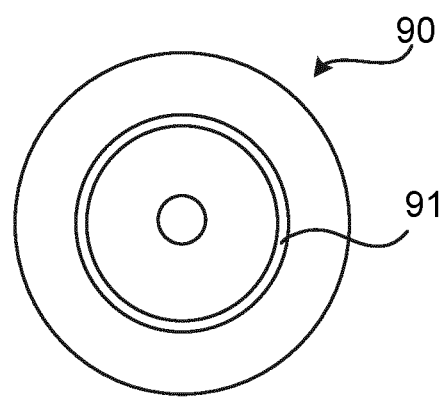
FIG. 4 shows one example of a computer program product 90 comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A method for controlling access to a physical space using an emergency delegation, the method being performed in a lock device and comprising the steps of:

receiving an access request from an electronic key;

obtaining a plurality of delegations, wherein each delegation is a delegation from a delegator to a delegatee, the plurality of delegations collectively forming a chain of delegations wherein when two delegations are chained together, the delegatee of one delegation is the delegator of the next delegation;

determining that a delegation in the chain of delegations is an emergency delegation, the emergency delegation indicating that access should only be granted when an emergency situation occurs;

determining when an emergency situation occurs; and granting access to the physical space when the chain of delegations starts in the lock device and ends in the electronic key; and when the emergency situation of the occurs.

ii. The method according to embodiment i, wherein one or more types of emergency situation are specified in the emergency delegation.

iii. The method according to embodiment ii, wherein the type of emergency situation is any one of break-in, fire, water leak, health emergency.

iv. The method according to any one of the preceding embodiments, wherein the step of determining when an emergency situation occurs comprises communicating with a smart home system.

v. A lock device for controlling access to a physical space using an emergency delegation, the lock device comprising:

a processor; and a memory storing instructions that, when executed by the processor, cause the lock device to:

receive an access request from an electronic key;

obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation;

determine that a delegation in the chain of delegations is an emergency delegation, the emergency delegation indicating that access should only be granted when an emergency situation occurs;

determine when an emergency situation occurs; and grant access to the physical space when the chain of delegations starts in the lock device and ends in the electronic key; and when the emergency situation occurs.

vi. The lock device according to embodiment v, wherein one or more types of emergency situation are specified in the emergency delegation.

vii. The lock device according to embodiment vi, wherein the type of emergency situation is any one of break-in, fire, water leak, health emergency.

viii. The lock device according to any one of embodiments v to vii, wherein the instructions to determine when an emergency situation occurs comprise instructions that, when executed by the processor, cause the lock device to: communicate with a smart home system.

ix. A computer program for controlling access to a physical space using an emergency delegation, the computer program comprising computer program code which, when run on a lock device causes the lock device to:
receive an access request from an electronic key;
obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation;
determine that a delegation in the chain of delegations is an emergency delegation, the emergency delegation indicating that access should only be granted when an emergency situation occurs;
determine when an emergency situation occurs; and grant access to the physical space when the chain of delegations starts in the lock device and ends in the electronic key; and when the emergency situation occurs.

x. A computer program product comprising a computer program according to embodiment ix and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for controlling access to a physical space using an emergency delegation, the method being performed in a lock device and comprising:
receiving an access request from an electronic key;
obtaining a plurality of delegations, wherein each delegation is a delegation from a delegator to a delegatee, the plurality of delegations collectively forming a chain of delegations wherein when two delegations are chained together, the delegatee of one delegation is the delegator of the next delegation;
determining that a delegation in the chain of delegations is an emergency delegation, the emergency delegation indicating that access should only be granted when an emergency situation occurs, wherein one or more types of emergency situation are specified in the emergency delegation; and
granting access to the physical space in response to both (i) determining that the chain of delegations starts in the lock device ends in the electronic key and (ii) determining that the emergency situation occurs.

2. The method according to claim 1, wherein the one or more types of emergency situation is at least one of a break-in, fire, water leak, or health emergency.

3. The method according to claim 1, wherein determining that the emergency situation occurs comprises communicating with an emergency service provider forming part of the chain of delegations.

4. The method according to claim 1, wherein determining that the emergency situation occurs comprises communicating with a sensor device in the physical space.

5. The method according to claim 4, wherein the sensor device is any of a wearable device, a fire detector, or water leak detector.

6. The method according to claim 1, wherein determining that the emergency situation occurs comprises communicating with a monitoring device collecting data from one or more sensor devices in the physical space.

7. The method according to claim 6, wherein determining that the emergency situation occurs comprises finding a mapping between the one or more emergency situations specified in the emergency delegation and one or more monitoring devices.

8. The method according to claim 6, wherein determining that the emergency situation occurs comprises communicating with a smart home system.

9. A lock device for controlling access to a physical space using an emergency delegation, the lock device comprising:
a processor; and
a memory storing instructions that, when executed by the processor, cause the lock device to:
receive an access request from an electronic key;
obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation;
determine that a delegation in the chain of delegations is an emergency delegation, the emergency delegation indicating that access should only be granted when an emergency situation occurs, wherein one or more types of emergency situation are specified in the emergency delegation; and
grant access to the physical space in response to both (i) determining that the chain of delegations starts in the lock device and ends in the electronic key and (ii) determining that the emergency situation occurs.

10. The lock device according to claim 9, wherein the one or more types of emergency situation is at least one of a break-in, fire, water leak, or health emergency.

11. The lock device according to claim 9, wherein the instructions to determine that the emergency situation occurs comprise instructions that, when executed by the processor, cause the lock device to communicate with an emergency service provider forming part of the chain of delegations.

12. The lock device according to claim 9, wherein the instructions to determine that the emergency situation occurs comprise instructions that, when executed by the processor, cause the lock device to communicate with a sensor device in the physical space.

13. The lock device according to claim 12, wherein the sensor device is any of a wearable device, a fire detector, or water leak detector.

14. The lock device according to claim 9, wherein the instructions to determine that emergency situation occurs comprise instructions that, when executed by the processor, cause the lock device to communicate with a monitoring device collecting data from one or more sensor devices in the physical space.

15. The lock device according to claim 14, wherein the instructions to determine that the emergency situation occurs comprise instructions that, when executed by the processor, cause the lock device to find a mapping between the one or more emergency situations specified in the emergency delegation and one or more monitoring devices.

16. The lock device according to claim 14, wherein the instructions to determine that the emergency situation occurs comprise instructions that, when executed by the processor, cause the lock device to communicate with a smart home system.

17. A computer program for controlling access to a physical space using an emergency delegation, the computer program comprising computer program code which, when run on a lock device causes the lock device to:
- receive an access request from an electronic key;
- obtain a plurality of delegations, wherein each delegation is a delegation from a delegator to a delegatee, the plurality of delegations collectively forming a chain of delegations wherein when two delegations are chained together, the delegatee of one delegation is the delegator of the next delegation;
- determine that a delegation in the chain of delegations is an emergency delegation, the emergency delegation indicating that access should only be granted when an emergency situation occurs; and
- grant access to the physical space in response to both (i) determining that the chain of delegations starts in the lock device and ends in the electronic key and when iii) determining that the emergency situation occurs.

18. A computer program product comprising a computer program according to claim 17 and a non-transitory computer readable means on which the computer program is stored.

\* \* \* \* \*